United States Patent [19]
Kürten et al.

[11] Patent Number: 5,507,145
[45] Date of Patent: Apr. 16, 1996

[54] STEAM GENERATING POWER STATION, PROCESS FOR OPERATING THE SAME, AND INTERLINKING NETWORK AND PROCESS FOR ITS OPERATION

[75] Inventors: Heribert Kürten, Uttenreuth; Uwe Radtke, Ronnenberg; Wolfgang Taube, Seevetal; Horst Vollmar, Herzogenaurach-Haundorf, all of Germany

[73] Assignee: Siemens Aktiengesellschaft, Munich, Germany

[21] Appl. No.: 247,351

[22] Filed: May 23, 1994

Related U.S. Application Data

[63] Continuation of PCT/EP92/02681, Nov. 20, 1992.

[30] Foreign Application Priority Data

Nov. 21, 1991 [DE] Germany ............................ 41 38 264.1

[51] Int. Cl.⁶ .................................................. F01K 13/02
[52] U.S. Cl. ................... 60/652; 60/678; 60/659
[58] Field of Search ............................... 60/652, 678, 659

[56] References Cited

U.S. PATENT DOCUMENTS

| | | | |
|---|---|---|---|
| 4,150,546 | 4/1979 | Collett ........................................ | 60/678 |
| 4,389,847 | 6/1983 | Kehlhofer ................................... | 60/652 |
| 4,695,932 | 9/1987 | Higashino .................................. | 363/14 |
| 5,324,891 | 6/1994 | Huang et al. ............................ | 174/15.4 |

OTHER PUBLICATIONS

"Effect of Superconducting...", Tripathy et al., IEEE 1992, vol. 7, No. 3, Aug. 1992, pp. 1266–1273.

"Die Regelung von Dampfkraftwerken", Klefenz, 1983, pp. 137–138.

"Beitragsmöglichkeiten der Speisewasser—, Kondensat . . .." Falgenhauer, VGB Kraftwerkstechnik, 1980, pp. 18–23.

"Energiespeicherung mit supraleitenden Spulen", Lorenzen et al., BWK, Sep. 1988, pp. 353–360.

"Supraleitende magnetische Energiespeicher . . . ", 1990 Handschin et al., Elektrizitätswirtschaft, pp. 111–115.

*Primary Examiner*—Denise L. Gromada
*Assistant Examiner*—L. Heyman
*Attorney, Agent, or Firm*—Herbert L. Lerner; Laurence A. Greenberg

[57] ABSTRACT

A steam generating power plant includes a generator connected to a network, a steam turbine driving the generator, a steam bleeder line being connected to the steam turbine and having a load-dependently adjustable valve, a system having a superconducting magnetic energy accumulator and being connected electrically parallel to the generator, and a control unit. The control unit furnishes electrical power directly from the superconducting energy accumulator to level a power deficit lasting on the order of several seconds in the network and the control unit at the same time adjusts the valve to increase steam available to the steam turbine. A process for operating a steam generating power plant, an interlocking electrical network in combination with a number of steam generating power plants, and a process for operating the interlinking network in combination with the steam generating power plants, are also provided.

16 Claims, 2 Drawing Sheets

STEAM GENERATING POWER STATION, PROCESS FOR OPERATING THE SAME, AND INTERLINKING NETWORK AND PROCESS FOR ITS OPERATION

CROSS-REFERENCE TO RELATED APPLICATION

This application is a Continuation of International Application Ser. No. PCT/EP92/02681, filed Nov. 20, 1992.

BACKGROUND OF THE INVENTION

FIELD OF THE INVENTION

The invention relates to a steam generating power plant having a steam turbine driving a generator and a steam bleeder line connected to the steam turbine. The invention also relates to a process for operating a steam generating power plant and to an interlinking network to which a number of steam generating power plants are connected. The invention additionally relates to a process for operating the interlinking network.

Steam generating power plants of the type referred to above are conventional and well known in the art.

In relatively large power supply systems, the objective arises of accumulating certain quantities of energy for the sake of keeping available what is known as "seconds-order reserve power". That objective arises from the necessity of keeping virtually spontaneously activatable electric power constantly available in that system in the event that sudden unpredictable power deficits occur, for instance from power plant failure.

In the UCPTE network (European Interlinking Network), every plant must keep available 2.5% of the instantaneous network load as "seconds-order reserve power". In the Federal Republic of Germany, half of the "seconds-order reserve power" must be activatable within five seconds, and the remainder within a further 25 seconds, to enable compensating for a power deficit in the public network. At present, preserving the "seconds-order reserve power" is done by throttling the turbine adjusting valves in the steam generating power plants that feed into the interlinking network, but that involves losses. In other words, such steam generating power plants are operated in throttled fashion. Upon a network load peak, or in other words a deficit of the total power plant output being supplied, that throttling is reduced, thus increasing the output of the steam generating power plants accordingly. It is a peculiarity of the throttling that because of the somewhat reduced efficiency, operating costs for the individual power plant correspondingly rise. Moreover, that type of power deficit compensation requires that the various steam generating power plants be built for somewhat greater capacity than would otherwise be the case. That accordingly increases investment costs as well. It would be desirable if the throttling could be avoided, so that both operating and investment costs could be kept low.

In order to compensate for power deficits within the range of from 30 seconds to 5 minutes or more in duration, it is already known to briefly suppress steam supply to feedwater preheaters, which are heated with bled steam, or in other words to undertake a shutoff of preheaters (as is the publication VGB Kraftwerkstechnik [VGB Power Plant Technology] 60, No. 1, January 1980, pp. 18–23). That provision makes an increased quantity of steam available immediately to the steam turbine. The time thus gained is usually sufficient to run the heating output in the steam generator up to the allowable limit output, if lesser load peaks are expected, or to activate pump accumulator power plants or gas turbine power plants. Leveling load peaks by briefly closing the valve in the steam bleeder line does not increase operating costs. However, it is a peculiarity of that type of leveling of load peaks that it responds with a delay which is on the order of 20 to 40 seconds, depending on the type of power plant. It is therefore unsuitable for leveling load peaks fast enough that there is no interruption in output or a drop in frequency. The term load peaks is understood in this case to mean especially sudden, unpredictable power deficits on the part of the power generator, of the kind that arise, for instance, from power plant failures. Load peaks that arise from a sudden connection of large-scale consumers, in large interlocking networks such as the European Interlocking Network, in contrast to isolated networks with only a few power plants, have only secondary significance.

In electrical energy supply, the provision of Superconducting Magnetic Energy Accumulators is also known (from the publication BWK, Vol. 40, 1988, No. 9, pg. 353–360, particularly FIG. 10, and the publication "Elektrizitätswirtschaft" [Electrical Industry], Vol. 89, 1990, No. 3, pp. 111–115). Power fluctuations in the electrical network can thus be compensated for. Therefore the peak demand in a network can also be covered, even for up to several hours. However, such superconducting magnetic energy accumulators have not yet been considered for furnishing the seconds-order reserve power, where the important factor is to have high capacities available for an interlocking network within a relatively brief period of time.

SUMMARY OF THE INVENTION

It is accordingly an object of the invention to provide a steam generating power station, a process for operating the same, an interlinking network and a process for its operation, which overcome the hereinafore-mentioned disadvantages of the heretofore-known methods and devices of this general type and in which load peaks or power deficits can be leveled or compensated for, without necessitating recourse to throttling, which entails losses. In other words, leveling of the load peaks should be achieved with only slight operating costs and slight additional investment costs. In particular, the seconds-order reserve power should be furnished at feasible cost.

With the foregoing and other objects in view there is provided, in accordance with the invention, a steam generating power plant, comprising a generator connected to a network; a steam turbine driving the generator; a steam bleeder line being connected to the steam turbine and having a load-dependently adjustable valve; a system having a superconducting magnetic energy accumulator and being connected electrically parallel to the generator; and a control unit, the control unit furnishing electrical power directly from the superconducting energy accumulator to level a power deficit persisting for or lasting on the order of several seconds in the network, and the control unit at the same time adjusting the valve to increase steam supply to or available to the steam turbine.

In accordance with another feature of the invention, the control unit feeds electrical energy of the generator furnished as a result of an increase in steam supply into the energy accumulator, after compensation for the power deficit.

In accordance with a further feature of the invention, the system for superconducting magnetic energy accumulation includes a superconducting magnet coil, a rectifier being regulated as a function of the electrical network, and a transformer, the rectifier and the transformer connecting the superconducting magnet coil to the electrical network.

In accordance with an added feature of the invention, the system for superconducting magnetic energy accumulation includes the control unit which adjusts the rectifier as a function of a load in the electrical network for leveling positive and negative power deficits or load peaks and valleys in the electrical network.

In accordance with an additional feature of the invention, there are provided means for closing the valve in the steam bleeder line as a function of load peaks in the electrical network.

In accordance with yet another feature of the invention, the system for superconducting energy accumulation includes a superconducting coil having a metal superconducting material, such as a niobium-titanium alloy, and a line made of a high-temperature superconducting material connecting the superconducting coil to a normal-conducting electrical line leading onward.

In accordance with yet a further feature of the invention, the system for superconducting magnetic energy accumulation is disposed independently of the power plant at a junction of the electrical network, and the valve in the steam bleed line of the power plant is remotely-controlled by the control unit of the system.

In accordance with yet an added feature of the invention, the system for superconducting magnetic energy accumulation is disposed independently of the power plant at a junction of the electrical network, and the valve in the steam bleed line of the power plant has its own control unit in the power plant for adjusting the valve.

With the objects of the invention in view, there is also provided in a process for operating a steam generating power plant having a steam turbine driving a generator being electrically connected to an electrical network, the improvement which comprises leveling a power deficit in the electrical network occurring within a period lasting on the order of several seconds with a control unit operating in a network-dependent fashion as a function of a power deficit detectable in the electrical network, by directly furnishing energy stored in a superconducting magnetic energy accumulator; and simultaneously adjusting a valve in a steam bleeder line with the control unit for increasing steam available to or supply to the steam turbine.

In accordance with another mode of the invention, there is provided a process which comprises adjusting the valve in the steam bleeder line for withdrawing steam, and charging the superconducting magnetic energy accumulator with a network-dependently regulated rectifier, when a load on the electrical network is decreasing.

In accordance with a further mode of the invention, there is provided a process which comprises maximally charging the superconducting magnetic accumulator controlled by the control unit in the event of excess power plant capacity.

In accordance with an added mode of the invention, there is provided a process which comprises charging the superconducting magnetic accumulator controlled by the control unit in the event of excess power plant capacity, and discharging the superconducting magnetic accumulator into the electrical network in the event of inadequate power plant capacity.

With the objects of the invention in view, there is additionally provided an interlocking electrical network in combination with a number of steam generating power plants connected to the interlocking electrical network, comprising steam turbines in the steam generating power plants; a steam bleeder line connected to the steam turbine in at least one of the steam generating power plants, and a valve built into the steam bleeder line; a superconducting magnetic accumulator being associated with at least one of the steam generating power plants; and a control unit for furnishing electrical power directly from the superconducting magnetic accumulator to level a power deficit lasting on the order of several seconds, the control unit adjusting the valve for increasing steam available to or supply to the steam turbine.

With the objects of the invention in view, there is furthermore provided a process for operating an interlinking network in combination with a number of steam generating power plants being connected to the interlocking electrical network, which comprises activating the superconducting magnetic energy accumulator for feeding into the interlocking network, if a power deficit occurs, for instance as a consequence of a failure of one of the steam generating power plants; and at least approximately simultaneously adjusting an increase in steam available to or supply to the steam turbines in one of the steam generating power plants, for instance with a preheater shutoff.

As noted, in order to level rapid and unmediated load peaks or power deficits, the system with a superconducting magnetic energy accumulator is connected to the network parallel to the generator, and the load-dependently adjustable valve is incorporated in the steam bleeder line. This provides the capability of compensating for a brief power deficit (load peak) in an interlocking network lasting several seconds, through the superconducting energy accumulator. Moreover, by simultaneously closing the valve in the steam bleeder line, the steam turbine output can be increased, so that if the power deficit (load peak) persists for longer, a somewhat increased generator capacity can be furnished, and the superconducting magnetic energy accumulator can be charged again once the power deficit (or load peak) fades. With this kind of leveling, the majority of power deficits (load peaks) in the electrical network can be compensated for without significant lessening in efficiency and with only a slight increase in operating costs. What is important is accordingly the combination of discharging the superconducting energy accumulator with increasing the steam supply to the steam turbine, for instance by shutting off the preheater through the adjustable valve.

As also noted, brief load peaks lasting on the order of several seconds are leveled by means of the network-dependently regulated transformer, by automatically furnishing energy stored in the superconducting magnetic energy accumulator, and at the same time the valve in the bleeder line is closed to increase the steam supply to the steam turbine.

In this way, automatic leveling of load peaks persisting on the order of several seconds is achieved, which involves only a slight increase in operating costs. As a result, in isolated networks, over-dimensioning of the power plant to level load peaks can be largely dispensed with. The investment costs are reduced considerably as a result. Moreover, frequency regulation and reactive power compensation are also made easier. In this way, both stabilization of the electrical network and leveling of surge loads of all kinds when large consumers are suddenly connected can also be achieved.

In an especially suitable feature of the invention, in order to furnish the seconds-order reserve power, the system for superconducting magnetic energy accumulation may include a regulator that controls the transformer as a function of the load in the electrical network, by leveling the positive and negative power deficits, or in other words the network load peaks and valleys. As a result, compensation for load peaks and valleys within a range on the order of tenths of a second is made possible.

In an especially advantageous further feature of the invention, the valve in the steam bleeder line can be closable as a function of network load peaks. In this way, furnishing of a power reserve is set in motion directly by means of the load peak itself, in the steam turbine as well. As a result, if the load peak persists for a relatively long time, somewhat increased generator capacity is available.

It has proved especially advantageous if a magnet coil that includes a magnetic superconducting material, such as a niobium-titanium alloy or an $Nb_3Sn$ alloy, and is connected to a normal-conducting electric line that leads onward through a line of a high-temperature superconducting material, such as $Y_1Ba_2Cu_3O_x$, is provided in the system for superconducting magnetic energy accumulation. This provision lowers the working resistance of the system for superconducting magnetic energy accumulation. Moreover, the transfer of ohmic lost heat in operation from the non-superconducting region to the region with low-temperature superconduction is lessened, since the normal-conducting region is no longer immediately adjacent the low-temperature superconducting portion, and ohmic losses do not arise in the region of high-temperature superconduction.

Other features which are considered as characteristic for the invention are set forth in the appended claims.

Although the invention is illustrated and described herein as embodied in a steam generating power station, a process for operating the same, an interlinking network and a process for its operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
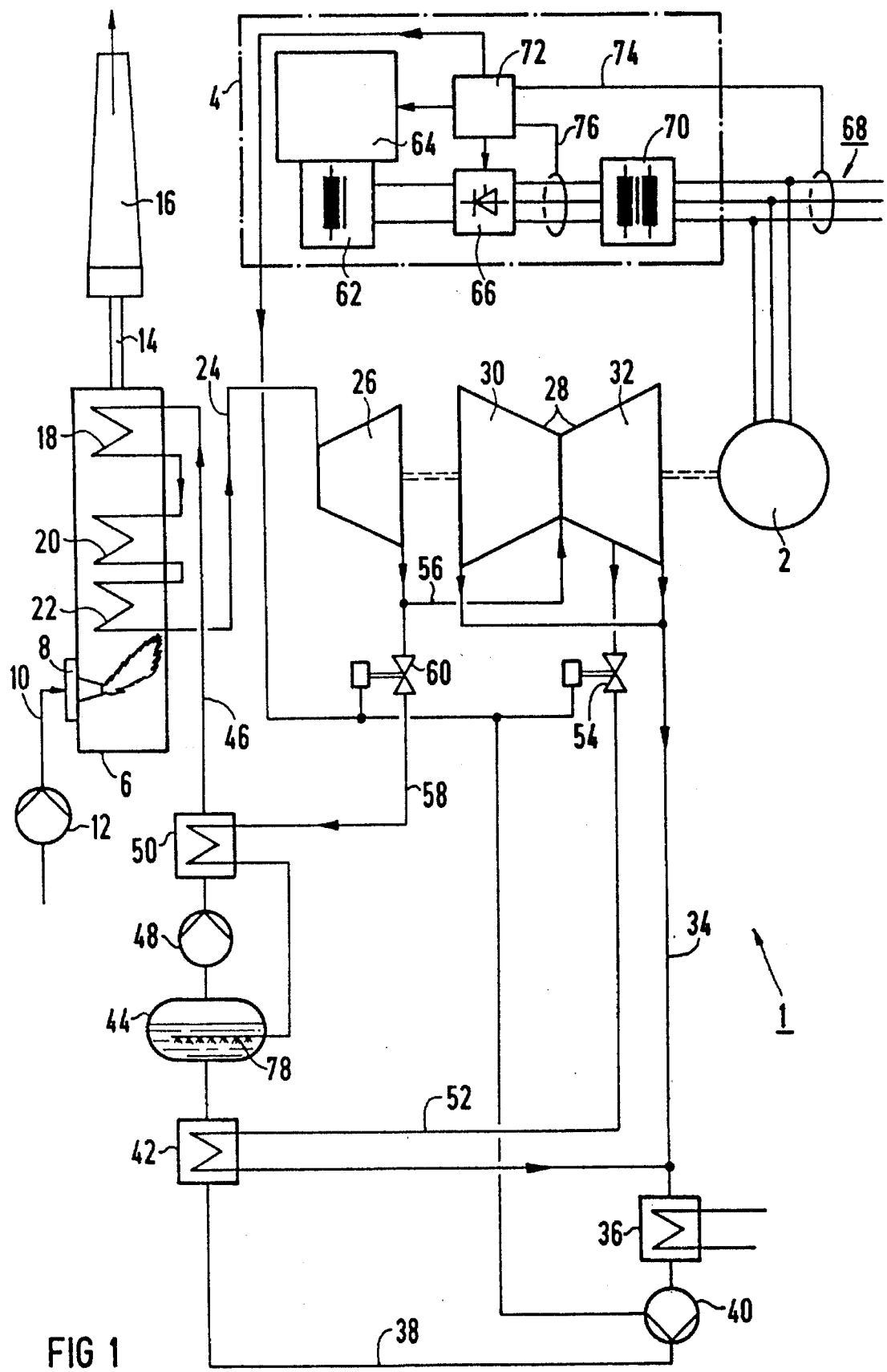
FIG. 1 is a block and schematic circuit diagram of an exemplary embodiment of a steam generating power plant in which a required seconds-order reserve power is furnished.

Referring now to the figures of the drawing in detail and first, particularly, to FIG. 1 thereof, there is seen a steam generating power plant 1 according to the invention, having a system 4 for superconducting magnetic energy accumulation, which is connected parallel to a generator 2 but may be disposed remote from the power plant 1. In the exemplary embodiment, the steam generating power plant 1 includes a fossil-fueled steam generator 6, having a burner 8 being disposed in a lower region of the steam generator 6 and communicating with a fuel pump 12 through a fuel line 10, and having a flue gas line 14 being connected to the steam generator 6 and leading into a chimney 16. Economizer heating surfaces 18, evaporator heating surfaces 20 and superheater heating surfaces 22 are indicated schematically in the steam generator 6. A high-pressure steam turbine 26 and a two-flow low-pressure steam turbine 28 in series therewith are connected to the high-pressure steam line 24 leaving the steam generator 6. Two low-pressure stages 30, 32 of the low-pressure steam turbine 28 are connected through a waste steam line 34 to a condenser 36. The condenser 36 communicates on the outlet side with a condensate line 38, in which a condensate pump 40, a condensate preheater 42 and a feedwater container 44 are connected in series. The feedwater container 44 is connected in turn on its outlet side to a feedwater line 46, in which a feedwater pump 48, a feedwater preheater 50, the economizer heating surfaces 18 and the evaporator heating surfaces 20 of the steam generator 6 are connected in series. The evaporator heating surfaces 20 of the steam generator 6 discharge on the outlet side to the superheater heating surfaces 22, which in turn discharge into the high-pressure steam line 24 of the steam generator 6.

A steam bleeder line 52 is connected to the low-pressure stage 32, which is on the right side of the low-pressure steam turbine 28 in the drawing. The bleeder line leads through a throttle valve or an adjusting valve 54 to heating surfaces of the condensate preheater 42, and from there to an inlet to the condenser 36. In the exemplary embodiment, a further steam bleeder line 58 branches off from a low-pressure steam line 56 that leads from the high-pressure steam turbine 26 to the low-pressure steam turbine 28. This further steam bleeder line 58 in turn leads through a further throttle valve or adjusting valve 60 to heating surfaces of the feedwater preheater 50, and from there to the feedwater container 44. The devices 52, 54 and 58, 60 may each be referred to as a device for preheater shutoff, as will be explained below.

The system 4 for superconducting magnetic energy accumulation is connected to an electrical three-phase network 68 which is parallel to the generator 2 of the steam generating power plant 1. The system 4 includes a superconducting magnet coil 62, a cooling system 64 that cools the magnet coil 62, a current rectifier or transformer 66 which may have thyristors and is connected to the magnet coil 62, a transformer 70 connecting the rectifier 66 to the three-phase network 68, and a regulator 72 which is constructed as a control unit and which adjusts the rectifier 66, the cooling system 64, the condensate pump 40, and the adjusting valves 60, 54 of the steam generating power plant 1. In the exemplary embodiment, the regulator 72 is equipped with two measurement lines 74, 76, which measure the flow of current and/or electrical parameters dependent on it, such as frequency, voltage and output, on both sides of the transformer 70.

During operation of the steam generating power plant 1, fuel is pumped through the fuel pump 12 into the burner 8 of the steam generator 6 and combusted there. After they have first heated the superheater heating surfaces 22, the evaporator heating surfaces 20 and the economizer heating surfaces 18, hot combustion gases leave the steam generator 6 through the flue gas line 14 and the chimney 16. The high-pressure steam leaving the superheater heating surfaces 22 drives the high-pressure steam turbine 26. The steam travels through the low-pressure steam line 56, reaches the low-pressure steam turbine 28, and from there flows through the waste steam line 34 into the condenser 36. The steam is condensed there, and condensate is pumped into the feedwater container 44 by means of the condensate pump 40 and the condensate line 38 which leads through the condensate preheater 42. Water of the feedwater container 44 is forced through the feedwater pump 48, through the feedwater line 46, into the feedwater preheater 50 and from there into the economizer heating surfaces 18 and the evaporator heating surfaces 20.

During normal operation, when a reserve capacity is not needed, bled steam from the low-pressure stage 32 of the low-pressure steam turbine 28 is carried through the adjusting valve 54 into the heating surfaces of the condensate preheater 42 and from there into the condenser 36, in order to improve efficiency. As a result, the condensate flowing into the feedwater container 44 is preheated. The feedwater undergoes further preheating from low-pressure steam, which is diverted from the low-pressure steam line 56 downstream of the high-pressure steam turbine 26 and is carried through the bleeder line 58 and the further adjusting valve 60 into the heating surfaces of the feedwater preheater 50 and from there into the feedwater container 44. There, the bled steam flows out of steam outlet nozzles 78 located below the surface of the water. As a result, the entire heat content of the bled steam withdrawn from the low-pressure steam line 56 is utilized to heat the feedwater before the feedwater is fed into the economizer heating surfaces 18. Further heating, evaporation and superheating are then undertaken by the flue gases in the steam generator 6.

Electric current is fed into the three-phase network 68 from the generator 2 which is driven by the high-pressure and low-pressure steam turbines 26, 28. This network in particular is an interlocking network. As was already mentioned, the system 4 for superconducting magnetic energy accumulation is connected to the electrical three-phase network 68 that is parallel to the generator 2 of the steam generating power plant 1.

Through the use of the measurement line 74, the regulator 72 detects power deficits or load excesses in the network 68. This may involve failure of a further power plant that has been feeding into the network 68. In that case, the regulator 72 can control the rectifier 66, in a manner that is known per se, in such a way that the load peaks are immediately compensated for or leveled, by means of energy stored in the superconducting coil 62. This regulation can be so fast that load changes are leveled within 0.1 seconds. When the full capacity of the network 68 is not being demanded, the regulator 72 can control the rectifier 66 in such a way that energy is fed from the three-phase network 68 into the superconducting coil 62 long enough to ensure that the superconducting magnetic energy accumulator 62 is again fully charged. Power which is supplied to the electrical network 68 or diverted from the electrical network 68 is then detected through the measurement line 76.

In the exemplary embodiment, in which the system 4 for superconducting magnetic energy accumulation is built into the steam generating power plant 1, in the event of an overload or the occurrence of a power deficit in the network 68, the regulator 72 simultaneously also closes the two regulating valves 54, 60 in the two bleeder lines 52, 58 of the steam generating power plant 1 and it also turns off the condensate pump 40. As a result, depending on the construction of the steam generating power plant 1, more steam is available at the low-pressure steam turbine 28 within from 20 to 40 seconds, so that the generator 2 can output increased energy into the electrical three-phase network 68. As the power demand in the electrical network 68 decreases, then the two valves 54, 60 in the two bleeder lines 52, 58 are opened again. The condensate pump 40 is turned on again, and electrical energy is again fed into the superconducting magnetic energy accumulator 62 through the three-phase transformer 70 and the rectifier 66.

In such a combination of an interruption of the supply of bled steam for heating the feedwater preheater 50 with a system 4 functioning as an energy accumulator for superconducting magnetic energy accumulation, it is a major advantage that the electrical power which is missing for a period on the order of several seconds can be replenished and thus the time until the two regulating valves 54, 60 in the steam bleeder lines 52, 58 are closed and the requisite additional electrical power can be fed into the electrical network 68 through the low-pressure steam turbine 28 can be bridged. The interruption in the delivery of bled steam and the shutoff of the condensate pump 40 can be continued for approximately 5 minutes without significant disadvantages. However, the interruption does not become operative until after a time delay that ranges between 20 and 40 seconds depending on the power plant 1, so that intrinsically, a brief voltage incursion in the event of load peaks cannot be avoided. Conversely, by combining an interruption in the supply of bled steam for feedwater heating with the system 4 for superconducting magnetic energy accumulation, as is provided by the invention, load peaks in the range from 0.1 seconds to 5 minutes in duration can be leveled. In the event of a longer-lasting overload, this time interval suffices to allow other energy carriers, such as pump storage power plants or gas turbine power plants, which belong to the minutes-order reserve system, to start up.

It is another major advantage of the combination of interrupting the withdrawal of bled steam on one hand, with the system 4 for superconducting magnetic energy accumulation on the other hand, according to the invention, that instabilities in the network 68 of the kind that arise from surge loads, for instance due to the startup of large machines such as industrial rolling lines, can be intercepted and compensated for.

Heretofore, the assumption was a mode of operation in which the superconducting magnetic energy accumulator 62 is charged to the maximum as much as possible within periods of adequate power plant capacity, so that in periods of inadequate power plant capacity there is sufficient energy to enable compensation for power deficits. However, it is also possible to adjust the regulator 72 in such a way that the superconducting magnetic energy accumulator 62 takes energy from the network 68 in times of excess power plant capacity and then charges only approximately halfway, and that in times of inadequate power plant capacity it feeds electrical energy into the network 68. Both the energy takeup and the energy output occur within the range of a few or several seconds. They serve to bridge the time, without a power incursion or excursion, until the other regulating mechanisms, such as the addition or shutoff of the bled-steam-heated feedwater preheaters 42, 44, 50, have taken effect. As advantageous as it is, this last mode of operation requires approximately twice as much storage capacity, since the energy accumulator 62 is only half-charged on average.

It is not absolutely necessary for the system 4 for superconducting magnetic energy accumulation to be integrated directly into the steam generating power plant 1 in the way shown in the exemplary embodiment. It is also conceivable for the system 4 for superconducting magnetic energy accumulation to be set up at some distance from the power plant 1, for instance in the vicinity of a network junction or in the vicinity of a consumer that produces brief surge loads. In that case, however, the valves 54, 60 for the steam bleeder lines 52, 58 of the steam generating power plant 1 must be remote-controlled, either by a separate control unit or by the regulator 72 of the system for superconducting magnetic energy accumulation that is set up at a remote location.

The preferred storage capacity of a system 4 for superconducting magnetic energy accumulation depends essentially on the type of network 68 and on the magnitude of the load peaks that occur in it. In the European Interlocking System, power ranges from 7 to 700 MW and energy contents on the part of the superconducting energy accumulator 62 of 60 kW hours to 10 MW hours are advantageous. A typical pair of values is, for instance, a peak capacity of approximately 125 MW and an energy content of approximately 2 MW hours for an energy supply plant in the European Interlocking Network that seeks to meet the requirements in terms of furnishing the seconds-order reserve power.

Figure 2:
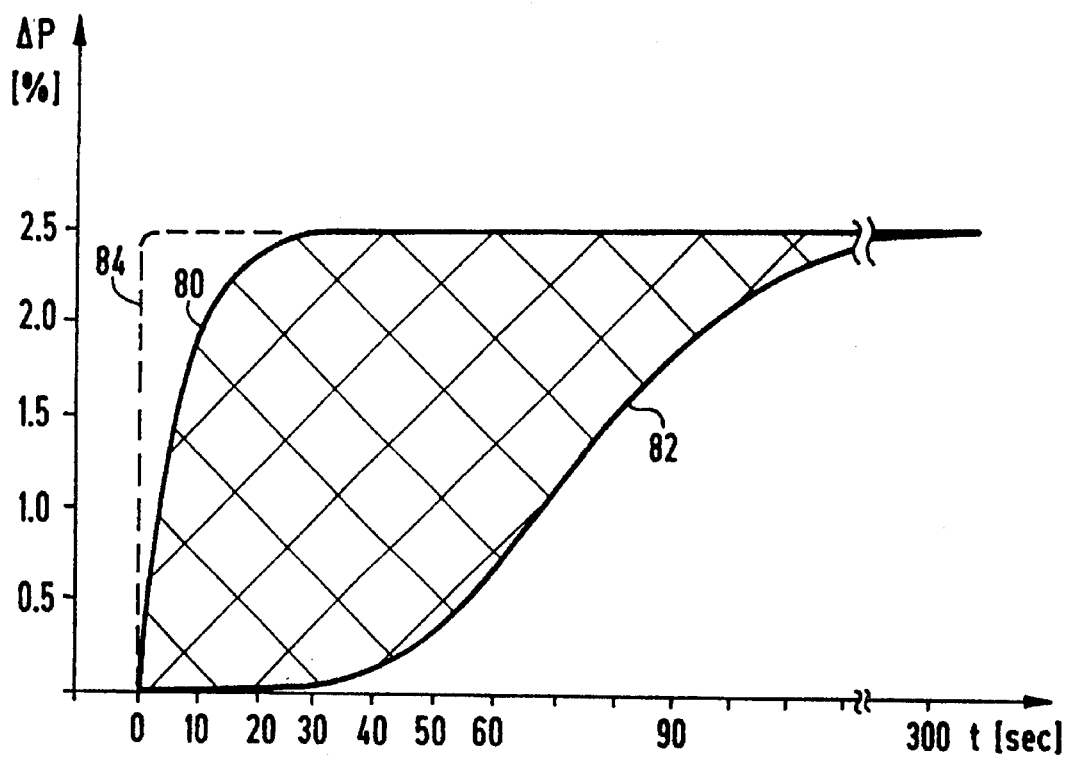
FIG. 2 is a timing diagram.

Referring to FIG. 2, the power plant 1 of FIG. 1 can be operated in accordance with a curve 80, in such a way that it meets the demands discussed at the outset, namely an output of $\Delta P= 1.25\%$ of the network load within 5 seconds and $\Delta P= 2.5\%$ within 30 seconds. The range indicated by a dashed line is brought to bear by the system 4. A curve 82 shows a contribution increasing over the course of a time t, of the preheater shutoff performed by means of the valves 54, 60. In practice, a substantially greater contribution can be attained from the system 4, as is illustrated by a curve 84. Accordingly, within a fraction of a second, the entire contribution of 2.5% can be furnished by the system 4 by itself.

Figure 3:
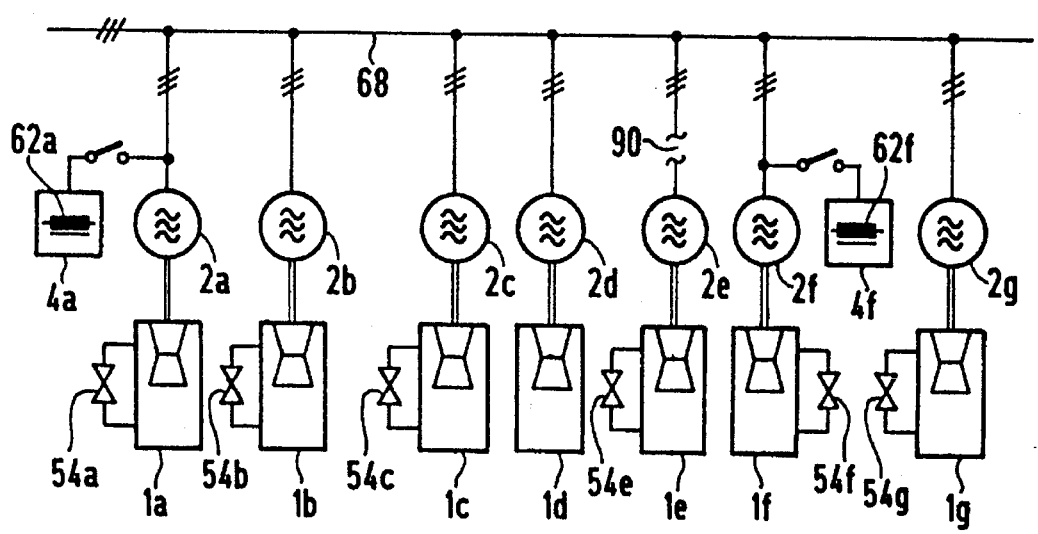
FIG. 3 is a schematic circuit diagram of an interlocking network having a number of steam generating power plants.

In FIG. 3, a larger number of power plants 1a, 1b, 1c, 1d, 1e, 1f, 1g are connected to an interlocking network 68. The power plants 1a–1g (except for 1d) are each equipped with a device for preheater shutoff, such as a valve 54a–54g in a waste steam line, as was discussed in detail in conjunction with FIG. 1. Systems 4a, 4f with superconducting magnetic accumulators 62a, 62f are assigned to only the two power plants 1a and 1b. Two large accumulators are more economical to manufacture than a number of small ones. If a power deficit occurs, for instance in the event of a defect 90 or a shutoff of the power plant 1e, the two accumulators 62a, 62f are activated, so that they output power to the interlocking network 68. At the same time, the devices for preheater shutoff are activated, so that with some delay (20 to 40 seconds, for instance), additional power is fed in from the intact power plants 1a, 1b, 1c, 1d, 1f, 1g.

We claim:

1. A steam generating power plant, comprising:

a) a generator connected to a network;

b) a steam turbine driving said generator;

c) a steam bleeder line being connected to said steam turbine and having a load-dependently adjustable valve;

d) a system having a superconducting magnetic energy accumulator and being connected electrically parallel to said generator; and e) a control unit, said control unit furnishing electrical power directly from said superconducting energy accumulator to level a power deficit lasting on the order of several seconds in the network, and said control unit at the same time adjusting said valve to increase steam available to said steam turbine.

2. The steam generating power plant according to claim 1, wherein said control unit feeds electrical energy of said generator furnished as a result of an increase in steam supply into said energy accumulator, after compensation for the power deficit.

3. The steam generating power plant according to claim 1, wherein said system for superconducting magnetic energy accumulation includes a superconducting magnet coil, a rectifier being regulated as a function of the electrical network, and a transformer, said rectifier and said transformer connecting said superconducting magnet coil to the electrical network.

4. The steam generating power plant according to claim 3, wherein said system for superconducting magnetic energy accumulation includes said control unit which adjusts said rectifier as a function of a load in the electrical network for leveling positive and negative power deficits or load peaks and valleys in the electrical network.

5. The steam generating power plant according to claim 1, including means for closing said valve in said steam bleeder line as a function of load peaks in the electrical network.

6. The steam generating power plant according to claim 1, wherein said system for superconducting energy accumulation includes a superconducting coil having a metal superconducting material, and a line made of a high-temperature superconducting material connecting said superconducting coil to a normal-conducting electrical line leading onward.

7. The steam generating power plant according to claim 6, wherein said metal superconducting material is a niobium-titanium alloy.

8. The steam generating power plant according to claim 1, wherein said system for superconducting magnetic energy accumulation is disposed independently of said power plant at a junction of the electrical network, and said valve in said steam bleed line of said power plant is remotely-controlled by said control unit of said system.

9. In a process for operating a steam generating power plant having a steam turbine driving a generator being electrically connected to an electrical network, the improvement which comprises:

leveling a power deficit in the electrical network occurring within a period lasting on the order of several seconds with a control unit operating in a network-dependent fashion as a function of a power deficit detectable in the electrical network, by directly furnishing energy stored in a superconducting magnetic energy accumulator; and simultaneously adjusting a valve in a steam bleeder line with the control unit for increasing steam available to the steam turbine.

10. The process according to claim 9, which further comprises adjusting the valve in the steam bleeder line for increasing steam available to the steam turbine, and charging the superconducting magnetic energy accumulator with a network-dependently regulated rectifier, subsequently to leveling the power deficit.

11. The process according to claim 9, which further comprises maximally charging the superconducting magnetic accumulator controlled by the control unit in the event of excess power plant capacity.

12. The process according to claim 9, which further comprises charging the superconducting magnetic accumulator controlled by the control unit in the event of excess power plant capacity, and discharging the superconducting magnetic accumulator into the electrical network in the event of inadequate power plant capacity.

13. An interlocking electrical network in combination with a number of steam generating power plants connected to the interlocking electrical network, comprising:

steam turbines in the steam generating power plants;

at least one steam bleeder line each connected to a corresponding one of said steam turbines in at least one of the steam generating power plants, and a valve, built into each of said at least one steam bleeder line;

a superconducting magnetic accumulator being associated with at least one of the steam generating power plants; and a control unit for furnishing electrical power directly from said superconducting magnetic accumulator to level a power deficit lasting on the order of several seconds and for adjusting said valve for increasing steam available to said steam turbine in response to said power deficit.

14. A process for operating an interlocking network in combination with a number of steam generating power plants being connected to the interlocking electrical network and including steam turbines in the steam generating power plants; at least one steam bleeder line each connected to a corresponding one of the steam turbines in at least one of the steam generating power plants, and a valve built into each of the at least one steam bleeder line; a superconducting magnetic accumulator being associated with at least one of the steam generating power plants; and a control unit for furnishing electrical power directly from the superconducting magnetic accumulator to level a power deficit lasting on the order of several seconds and for adjusting the valve for increasing steam available to the steam turbine, the process, carried out by said control unit, comprising:

activating the superconducting magnetic accumulator for feeding into the interlocking network if a power deficit occurs; and at least approximately simultaneously adjusting an increase in steam available to the steam turbine in one of the steam generating power plants by adjusting said valve in said at least one steam bleeder line.

15. The process for operating the interlinking network according to claim 14, which further comprises activating the superconducting magnetic energy accumulator for feeding into the interlocking network if the power deficit occurs as a consequence of a failure of one of the steam generating power plants.

16. The process for operating the interlinking network according to claim 14, which further comprises adjusting the increase in the steam available to the steam turbines with a preheater shutoff.

* * * * *